Patented July 23, 1940

2,208,781

UNITED STATES PATENT OFFICE 2,208,781

ELECTRIC CONTROL OF DISTRIBUTION SYSTEMS

Joseph D. Wood, Bethlehem, Pa., assignor to Roller-Smith Company, a corporation of New York Application January 13, 1938, Serial No. 184,736

16 Claims. (Cl. 175—294)

This invention relates to improvements in the method and means for the control and protection of alternating current distribution systems particularly applicable to installations of large capacity, such as in cities where there are large concentrations of power distributed from substations to various sections of the distribution network. The distribution from the sections is usually accomplished by means of transformers and circuit breakers installed in manholes under the street or side walks of cities from which the energy is supplied to the distribution network. Usually the supply from the substations to the manhole sections is by means of loop feeders and this invention particularly relates to systems having loop feeder circuits. In the case of a fault occurring in any part of the feeder system, it has been the practice to cause the oil circuit breakers to interrupt the circuit at the manhole locations, requiring these breakers to have high interrupting capacities. This requires the installation of high capacity and therefore expensive apparatus throughout the system. It also requires the installation in the manholes of comparatively large sized apparatus while the space available is usually small, making the use of large units undesirable and objectionable. Furthermore, the manholes are usually damp or subjected to the collection of water which, with the interruption of currents of high capacity, might give rise to dangerous conditions.

One of the main objects of the present invention is to provide controlling apparatus in systems having loop feeder circuits which will avoid the interruption of circuits of high kilo-volt-amperes at the manholes, or sections, upon the occurrence of a fault and insure the initial interruption of the circuits at the main or substations. Another object is to cause the opening of the circuit or circuits at the distribution sections only after the main circuit has been interrupted at the substation. Another object is to provide means whereby the circuit at the main or substation will be reclosed after the affected circuit at the manhole has been opened. Another object is to provide a system of this character wherein the circuit or section affected by the fault will be isolated and removed from connection to the system while permitting the unaffected circuits or sections to continue in operation. Another object is to reduce the size and cost of the apparatus required to be installed in the manholes, or distribution sections, and thus economize in the amount of space required at such locations where limitation of space is most desired. Another object is the reduction of danger by avoiding the interruption of circuits of high capacity at the manholes or sections. Another object is to minimize the necessity for and to facilitate the replacement or repair of parts and the cost thereof in the manholes or sections. Other objects and advantages of this invention will be understood from the following description and accompanying drawings which illustrate preferred embodiments.

In the United States patent to Chase No. 1,543,370 granted June 23, 1925, is disclosed a loop system of distribution wherein, upon the occurrence of a fault, the affected section may be isolated from the system while permitting the remaining portions of the system to remain in service. The Chase system has the disadvantages above mentioned whereas the present invention overcomes these objections while maintaining the advantages of the Chase system.

Figure 1:
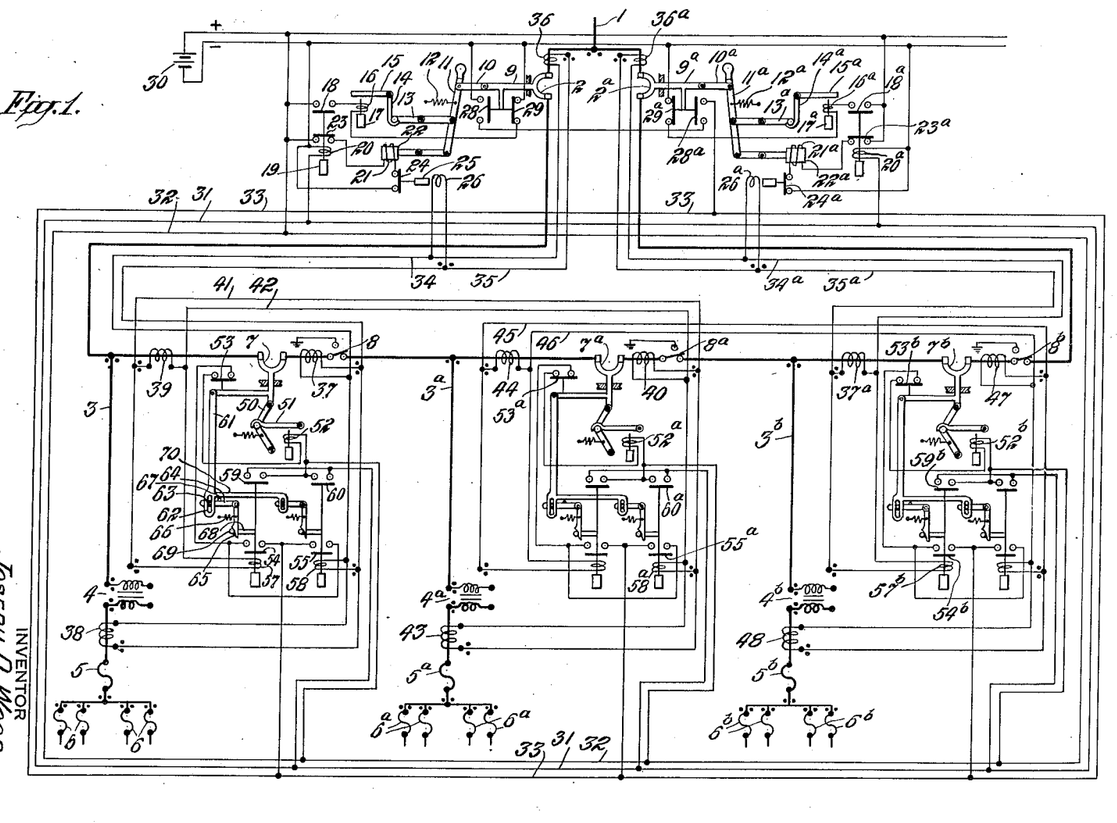
Fig. 1 is a diagram of a loop feeder system illustrating one embodiment of the invention and illustrates a three-phase system which for simplicity is represented as a single line with dots to indicate the three phases in a conventional manner.

Referring to Fig. 1 of the accompanying drawings, the high voltage three-phase supply line 1 entering the substation, is indicated as a single line with dots at the junction to indicate the three phases. From this incoming line the circuit is shown divided into two branches passing through main circuit breakers 2 and 2a which are high capacity oil breakers of suitable form. From the breaker 2, the main loop circuit is shown in heavy lines extending to the left-hand manhole or section from which a branch circuit 3 passes to a distribution transformer 4 and then through a main fuse 5 to a suitable number of distribution circuits connected through fuses 6 to the distribution network. The main loop circuit at this section passes through a circuit breaker 7 and then through a disconnection switch 8 to another manhole or section where a branch circuit 3a leads to a transformer 4a and then through a main fuse 5a to the distribution circuits having fuses 6a. In this section is located a circuit breaker 7a in the main loop circuit and the circuit then continues through a disconnection switch 8a to the next manhole or section which is similarly provided with a distribution transformer 4b and the parts correspondingly numbered. Thence the main loop circuit continues through any additional number of sections required, back to the substation circuit breaker 2a and supply line 1.

In describing the controlling apparatus, it will be understood that the apparatus may be employed in any suitable form of construction and that the invention is illustrated diagrammatically for simplicity and clarity in understanding the function and the inter-relationship of the parts. The two main high capacity circuit breakers at the substation and their controlling parts are similar to each other and likewise the apparatus installed in each manhole or section is similar to that in each of the others. Thus a description of one of the main circuit breakers and its controlling parts and a description of the apparatus in one of the sections, will suffice for each of the others, the corresponding parts being similarly numbered but designated with different exponent letters.

Referring to the left-hand main circuit breaker, the movable contacts are controlled by reciprocal movement of a rod 9 which in turn is connected by a link 10 to a main element 11 which is shown as having a handle for manual closing when desired. The usual spring tending to open the breaker is indicated at 12. The element 11 is pivotally mounted upon a lever 13 which is mounted on a fixed central pivot. In the closed position of the breaker, the element 13 is restrained from movement by a latch 14 mounted upon a fixed pivot and having an extension 15 which is adapted to be raised for tripping the latch and releasing the breaker by a relay having a controlling coil 16 and a plunger or armature 17. This trip coil is controlled by a relay switch 18 carried by a plunger or armature 19 which is controlled by a coil 20. The breaker may be automatically closed by a closing coil 21 acting upon a core 22 which is connected through links to the lower end of the main element 11. The closing coil 21 is controlled by a relay switch 23 affected by the plunger of coil 20. This coil is normally deenergized and the switch 23 is normally closed while the switch 18 is normally open. In the circuit of the closing coil 21 is a normally closed relay switch 24 carried by an armature or plunger 25 controlled by a coil 26 for opening the switch 24. This is a hand reset relay switch which is reclosed by hand when required. The circuit breaker of the type described, which is known as the non-closable on overload type, may be of any suitable form, one example of such a circuit breaker being shown in Wood Patent No. 1,871,768 granted August 16, 1932.

A double switch having the two switches 28 and 29 is controlled by the breaker so that when in the closed position the switch 29 is closed and switch 28 is open, while in the open position of the breaker, the switch 28 is closed and the switch 29 is opened. This double switch is shown mechanically connected to the rod 9 of the breaker for controlling its movement but obviously may be controlled in any way by the opening and closing of the breaker.

A suitable direct current source of energy such as indicated by the battery 30 supplies current to the positive and negative lines at the top of Fig. 1 and is used for controlling the operation of the apparatus. Thus the trip coil 16 of the circuit breaker is connected from the positive line through the normally open relay switch 18 to the coil 16 and thence through the normally closed switch 29 to the negative side of the battery. Thus when the coil 20 acts to close the switch 18, the trip coil 16 will be energized to automatically open the breaker.

The closing coil 21 of the breaker is connected from the positive side of the battery through the normally closed switch 23 to the coil 21 and thence through the normally closed switch 24 to the negative side of the battery.

The relay coil 20 is connected from the negative side of the battery through the coil to the pilot line 31 which extends from the substation in a closed loop through each of the manholes or distributing sections. The positive side of the battery is connected to a pilot line 32 which extends from the substation in a closed loop through each of the distributing sections. The normally open switch 28 has one of its contacts connected to the negative side of the battery and the other contact is connected to the corresponding contact of switch 28a of the right-hand substation breaker, the other contact of which is connected to a pilot line 33 which extends in a closed loop from the substation through each of the distributing sections.

The coil 26 is a three-phase relay coil having its neutral point connected to a line 34 while the three-phase lines from its coils are connected to the three-phase control lines 35, the connections of which will be hereinafter explained.

At the substation in each branch of the three-phase main line leading to the main circuit breakers 2 and 2a are located balance current transformers having three-phase windings 36 and 36a. The neutral point of the current transformer windings 36 is connected to the neutral line 34 and the neutral point of the current transformer windings 36a is connected to the neutral line 34a. The three-phase terminals from the current transformer 36 are connected to the three-phase control lines 35 which extend to the first manhole and are there connected to the three-phase terminals of the balanced current transformer 37, the neutral of which is connected to the neutral line 34. The current transformer 37 is related to the three-phase power lines of the main loop power circuit at the side of the circuit breaker 7 opposite from the incoming power lines leading to breaker 2. The three-phase control lines 35 and neutral also lead to the three-phase current transformer 38 related to the three-phase distribution lines extending from the secondary of the manhole transformer 4.

Similarly the three-phase control lines 35a and neutral line 34a extend from the current transformer 36a to the right-hand manhole at the end of the loop. A current transformer 37a is located in this manhole in relation to the power lines of the loop at the side of the circuit breaker 7b opposite from that to which the power lines from the substation circuit breaker 2a is connected. This current transformer 37a has its neutral connected to the neutral line 34a, while its three-phase terminals are connected to the three-phase control lines 35a.

On the incoming power lines of the left-hand manhole before connection to the circuit breaker 7, is located a balance current transformer 39 from which the three-phase control lines 41 and the neutral line 42 lead to the three-phase current transformer 40 of the next manhole or section. This transformer is related to the main loop circuit on the opposite side of the circuit breaker 7a from the power lines which come from the circuit breaker 7 of the adjacent manhole. The control lines 41 and 42 extend to a current transformer 43 which is related to the three-phase distributing lines which are outgoing from the secondary of the transformer 4a. In the same way a current transformer 44 is related to the power lines passing to the circuit breaker 7a from the circuit breaker 7 and located at the middle manhole. This transformer is connected to the three-phase control lines 45 and neutral line 46. These lines extend to the next manhole where they are connected to another three-phase current transformer 47 located on the opposite side of the circuit breaker 7b from the power lines of the loop extending from the circuit breaker 7a of the adjoining manhole. These control lines 45 and 46 also lead to a current transformer 48 related to the three-phase distribution lines extending from the transformer 4b. In like manner any required number of manholes or distribution sections may be additionally connected in the loop circuit and have their balance current transformers connected in the manner described, that is, the current transformer of the loop circuit on one side of the circuit breaker of one manhole is connected to the current transformer of the loop circuit on the opposite side of the circuit breaker of the next manhole and to the current transformer of the distribution lines of one of the manholes, for the purpose of removing from the loop circuit any section wherein a fault occurs. The windings of each of the current transformers are proportioned with reference to the power circuits to which they are related so as to cause the potentials in their corresponding control circuits to be approximately balanced under normal current conditions. That is, the balancing of the current transformers in their respective circuits must be sufficient to avoid affecting any control device under normal conditions which is related to the respective control circuits, while any unbalancing of any one of these control circuits upon the occurrence of a fault will create a sufficiently pronounced unbalanced condition to cause the control device affected by its circuit to operate and secure the desired control, as explained in said Chase patent.

The control apparatus in each manhole is similar and a description of one will suffice for each of the others. Referring particularly to the left-hand manhole, the circuit breaker 7 is diagrammatically indicated as being closed by toggle links 50 against a spring tending to open the breaker and is shown retained in closed position by a latch 51 controlled by a trip coil 52. This trip coil is connected in circuit with a switch 53 which is controlled by the position of the circuit breaker 7, the switch being closed when the circuit breaker is closed and opened when the circuit breaker is open, as indicated by the mechanical connection of the switch 53 to the movable rod of the circuit breaker. A circuit from the switch 53 continues to the outside fixed contacts of a normally open relay switch 54 and of a normally open relay switch 55. The inside fixed contacts of these two switches are electrically connected together and to the pilot wire 33. The switch 54 is closed upon sufficient energization of the coil 57 of the relay by movement of its plunger or armature. The coil 57 is a three-phase relay coil connected in circuit between the three-phase control lines 41 and the neutral line 42. This relay 57 is therefore responsive to an unbalanced relationship of the current transformer windings 39, 40 and 43. The relay switch 55 is similarly closed upon sufficient energization of the three-phase relay coil 58 which is connected to the three phase control wires 35 and neutral 34, being responsive upon the unbalancing of the currents due to the current transformers 36, 37 and 38.

The relay coil 57, in addition to actuating the switch 54 to closed position upon the occurrence of an abnormal condition, will similarly actuate another normally open switch 59. Likewise the responsive relay coil 58 will actuate another normally open switch 60 to closed position upon the unbalancing of the currents in its circuit. The two inner fixed contacts of the switches 59 and 60 are connected together and to the positive pilot wire 32, and one terminal of the trip coil 52 is also connected to the positive wire 32. The two outer fixed contacts of the switches 59 and 60 are connected together and to the pilot wire 31.

The pairs of switches 54, 59 and 55, 60 are mechanically interlocked with the circuit breaker 7 in such a way that after either one of these pairs of switches have been moved to closed position, it cannot move to open position until the circuit breaker 7 has opened. This is for the purpose of insuring that the main breaker at the substation be opened before either of the pairs of relay switches can move to open position. This is accomplished by causing the said pairs of relay switches to be mechanically restrained in closed position, or either one of them, after being closed, until mechanically released by the opening of the circuit breaker 7. This interlocking may be accomplished in various ways and one form is diagrammatically indicated in Fig. 1. A rod 61 is shown mechanically connected to a movable element of the breaker 7. The lower end of the rod is provided with a slot 62 through which a pin 63 projects. The pin is carried by one end of a bell crank 64 mounted on a fixed pivot. The lower end of the lever is in the form of a latch with a depending guiding portion 65. The latch is provided with a spring 66 tending to hold the lever against a fixed pin 67. From the pair of switches 54, 59 extends an arm 68 carrying a pin 69 at its outer end. In the normal open position of this pair of switches, the pin is below the hook of the latch 64 and against the guiding portion 65. When the switches 54, 59 are moved upwardly to their closed position by the relay coil 57, the pin 69 will move upwardly and force the depending arm of the latch 64 to the right, permitting the pin to pass into the hook of the latch and be held there and restrain the pair of switches in closed position. However, upon the opening of the circuit breaker 7, the rod 61 will be moved downwardly and cause the upper end of the slot 62 to engage the pin 63 and thereby trip the latch to permit the switches 54, 59 to return to their open position. The pair of switches 55, 60 is similarly interlocked by parts corresponding to those already described and shown as carried by the rod 70 connected to the rod 61.

Each of the other distributing sections is provided with control apparatus the same as that already described with reference to the left-hand section and their connections and function of the parts will be understood from the following general description of operation.

Figure 4:
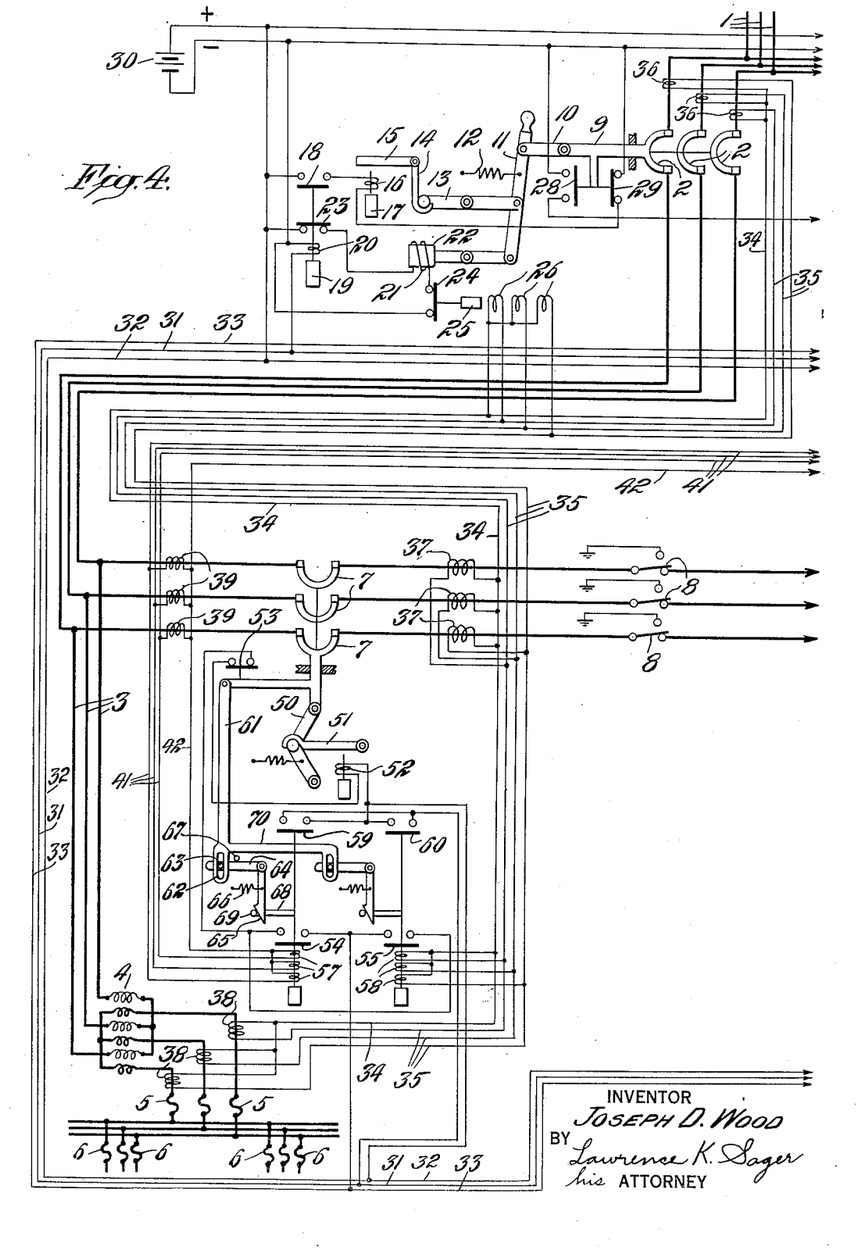
Fig. 4 is a diagram corresponding to a portion of Fig. 1 and wherein the three-phase lines are shown instead of being represented by a single line and dots as in Fig. 1.

Fig. 4 is a diagram representing the left-hand portion of Fig. 1 and in which the three-phase lines are drawn out instead of being represented by single lines and dots, the latter conventional form having been used for obtaining simplicity of the drawing. It will be understood from Fig. 4 how the entire system of Fig. 1 would be shown if the three-phase lines were indicated throughout instead of representing them by a single line and dots.

Fig. 1 shows all parts in their position of normal operation. It might first be assumed that a fault occurs in that part of the main power loop circuit between the circuit breaker 2 and the left-hand manhole. In that event, the normal balanced relationship of the current transformers 36, 37 and 38 connected to the three-phase control lines 35 and 34 will be so unbalanced, or reversed, in relationship to each other as to impose sufficient unbalanced current upon the relay 58 to cause it to actuate the switches 55 and 60 to their closed positions. This causes the circuit of the relay coil 20 at the substation to be closed by a circuit from the positive pilot wire 32 at the left-hand manhole through relay switch 60 to the pilot wire 31 and then to the substation through the relay coil 20 to the negative side of the battery. This excitation of the coil 20 causes the opening of the circuit of the closing coil 21 and the closing of the circuit of the trip coil 16 of the main circuit breaker 2, the trip coil circuit being closed by a path from the positive side of the battery through the relay switch 18, through the trip coil 16 and through switch 29 to the negative side of the battery. The substation circuit breaker 2 is thereby opened. In the same way the circuit breaker 2a of the substation is simultaneously opened by a similar excitation of the relay coil 20a and the excitation of the trip coil 16a by a circuit from the positive side of the battery through switch 18a, trip coil 16a and then through switch 29a to the negative side of the battery. Thus both of the substation breakers have been opened, interrupting the supply of current to the power loop circuit by means of the high capacity circuit breakers in a safe location, while the manhole circuit breakers all remain closed.

However, the opening of the substation breakers will immediately cause the closure of the circuit through the trip coil 52 of the left-hand manhole circuit breaker due to the fact that the switches 28 and 28a at the substation are automatically closed by the opening of the substation breakers and the fact that the relay coil 58 has been energized to close the relay switch 55. The closing of the trip coil circuit is accomplished by a path from the positive pilot 32 at the left-hand manhole through the trip coil 52, thence through the switch 53 which is closed by breaker 7 being still closed and then through relay switch 55 to the pilot 33 and then to the substation through the switches 28a and 28 to the negative side of the battery. This automatically opens the circuit breaker 7 at the left-hand manhole but none of the other manhole breakers are opened because no one of their relay coils corresponding to the relay coil 55 or 57 of the left-hand manhole has been energized.

When the relay coil 58 actuated the switches 55 and 60 to their closed positions, these switches were restrained by the pin of these movable parts passing over the guide of the latch and being latched in closed position so that even if the relay coil 58 should momentarily become deenergized, the switches 55 and 60 could not open. However, upon the opening of the substation main breakers and thereby causing the opening of the manhole breaker 7 in the manner already described, the mechanically interlocking parts controlled by the opening of the breaker 7 through the rod 61 are caused to release the latch and thereby permit the switches 55 and 60 to return to their open position. In the meantime, the fuses 5 or the fuses 6, or a sufficient number of them, have opened due to the feed back from the network system to which they are connected which results in the relay coil 58 not receiving sufficient current to reclose the switches 55 and 60. The opening of these relay switches 55 and 60 deenergizes the relay coils 20 and 20a at the substation. This permits the substation breaker 2a to be closed by the closure of the circuit of closing coil 22a of the breaker by a circuit from the positive side of the battery through switch 23a, through closing coil 21a, switch 24a and then to the negative side of the battery. Therefore the main circuit breaker 2a will be closed and cause power to be supplied to the loop circuit by passing from the main supply line 1 to the right-hand manhole and to the adjoining manholes; but in view of the fact that the circuit breaker 7 has been opened, no energy is supplied from the substation breaker 2a to the left-hand manhole or to the distributing transformer 4.

Moreover, with the particular location of the fault above assumed, the main circuit breaker 2 cannot reclose because the circuit of its closing coil 22 has in the meantime been opened at the hand reset relay switch 24. The coil 26 of this switch by being connected to the circuit of the current transformer windings 36, 37 and 38 was subjected to the unbalanced current previously assumed to occur, resulting in automatically opening the switch 24. In view of the fact that this switch does not automatically return to its closed position upon the coil 26 being deenergized and necessitating its reset by hand, the switch 24 remains open until reclosed by the station operator after the assumed fault has been corrected. This hand reset relay is indicated as having its parts moved in a horizontal direction in order to digrammatically indicate that it does not automatically assume its closed position after being opened by the coil.

From the foregoing it is apparent that upon the occurrence of a fault in the main loop circuit from the main breaker 2 to the manhole breaker 7, or in the transformer 4, or the lines leading thereto, the supply circuit is first interrupted at the main breakers of the substation, thereby relieving the manhole breakers from the necessity of interrupting circuits of high kilo-volt-ampere capacity. This permits the manhole breakers to be of much lower capacity than would otherwise be required and avoids the danger of interrupting high capacity power circuits at the manholes. It will also be understood from the foregoing that upon the opening of the main breakers at the substation, and not until then, the manhole breaker 7 was automatically opened which thereupon, in the instance assumed, resulted in the automatic reclosing only of the main breaker 2a at the substation for the purpose of supplying power to the unaffected portions of the loop circuit. The result was the removal of the affected portion of the loop from circuit as well as the supply from the left-hand manhole.

It may now be assumed that instead of the fault occurring in the circuit between the substation breaker 2 and the manhole breaker 7, the fault occurs in the section of the loop circuit between the manhole breaker 7 and manhole breaker 7a or in the transformer 4a or feeder line 3a. Under these conditions the current transformer windings 39, 40 and 43 are so affected as to disturb their balanced relationship, by change in their relative potentials, sufficiently to cause the relay coils 57 and 58a to actuate their respective switches 54, 59 and 55a, 60a to their closed positions. The closure of this pair of switches, serves to close the circuits of the relay coils 20 and 20a at the substation. This is evident in the case of the closure of switches 54 and 59 by tracing a path from the positive line 32 at the left-hand manhole through switch 59 to the pilot wire 31 and then to the substation from this wire through the coils 20 and 20a to the negative side of the battery; and in the case of the middle manhole, the circuit is similarly traced from the positive line 32 through the switch 60a to the line 31 and through the relay coils 20 and 20a at the substation. The excitation of the relay coils 20 and 20a causes the opening of the main breakers at the substation in the manner already described. This action next causes the opening of both manhole breakers 7 and 7a in a manner similar to that already described, the trip coil 52 of the left-hand manhole breaker being closed by a circuit from the positive line 32 through coil 52, switch 53, switch 54 to line 33 and thence to the substation through switches 28a and 28 to the negative line, while the trip coil 52a of the middle manhole is closed by a circuit from positive line 32, through coil 52a, switch 53a, switch 55a and then by wire 33 to the substation and through switches 28a, 28 to the negative line. The automatic opening of the manhole breakers 7, 7a results in automatically releasing the switches 54, 59 of the left-hand manhole and switches 55a, 60a of the middle manhole, permitting them to assume their normally open positions. This action results in deenergizing the coils 20, 20a at the substation, causing the opening of the circuit of the trip coils 16 and 16a at the substation and also causing the closure of the circuits of closing coils 21, 21a. Both of the main substation breakers are thereupon closed, resulting in restoration of the supply power to all portions of the loop circuit except that between breakers 7 and 7a and the supply to the transformer 4a. In this case both substation main breakers 2, 2a are automatically reclosed because neither of the coils 26, 26a is affected by the occurrence of the fault in the instance assumed.

In the same way, whenever a fault occurs in any section between two manholes, the same sequence of operations will automatically take place and result in the removal of the affected section from the circuit by the opening of the two manhole breakers between which the fault occurs.

The occurrence of a fault will now be considered in the section of the loop circuit between the substation breaker 2a and the right-hand manhole. In this case the normal relationship of potentials applied to the circuit of the lines 34a and 35a by the current transformers 36a and 37a and will be so disturbed as to cause the responsive coil 57b to close its contacts 54b, 59b. This results in the opening of the main circuit breakers at the substation in the manner already described, first by the closure of circuits through the relay coils 20, 20a of the substation breakers by a path from positive line 32 at the right-hand manhole through switch 59b to pilot wire 31 to the substation and then through the coils 20 and 20a to the negative line, and then by closing the circuits of trip coils 16 and 16a by the closure of switches 18 and 18a. The opening of the substation breakers then results in the opening of the breaker 7b at the right-hand manhole by the closing of a circuit of the trip coil 52b from the positive line 32 through the coil 52b, switch 53b, switch 54b to line 33 and then to the substation through switches 28a, 28 to the negative line. The opening of the manhole breaker 7b causes the responsive coil 57b to be deenergized and the movement of its controlled contacts to open position which in turn results in the opening of relay coils 20 and 20a at the substation. The left-hand substation breaker 2 will now be automatically reclosed by the closure of the switch 23 but the substation breaker 2a will not be closed. This is due to the fact that the unbalancing of the circuits 34a, 35a caused the relay coil 26a to respond and open the switch 24a which remains in the open position until manually reset. This opening of the circuit of closing coil 21a, prevents the circuit breaker 2a from being automatically closed. Thus the affected portion of the loop circuit is automatically cut out by the main breaker 2a and manhole breaker 7b remaining open.

Disconnection switches 8, 8a and 8b are provided for the purpose of facilitating the testing and repair of the affected circuits. By opening these disconnection switches after the circuit breakers have opened, the affected section will be entirely isolated. The disconnection switches are double-throw switches and make a ground connection when thrown from their normal positions. The breaker in the affected section may then be closed which results in grounding the affected section and permitting the use of the grounding terminals for applying test voltage to the cables of the affected section and thereby locating the fault.

Figure 2:
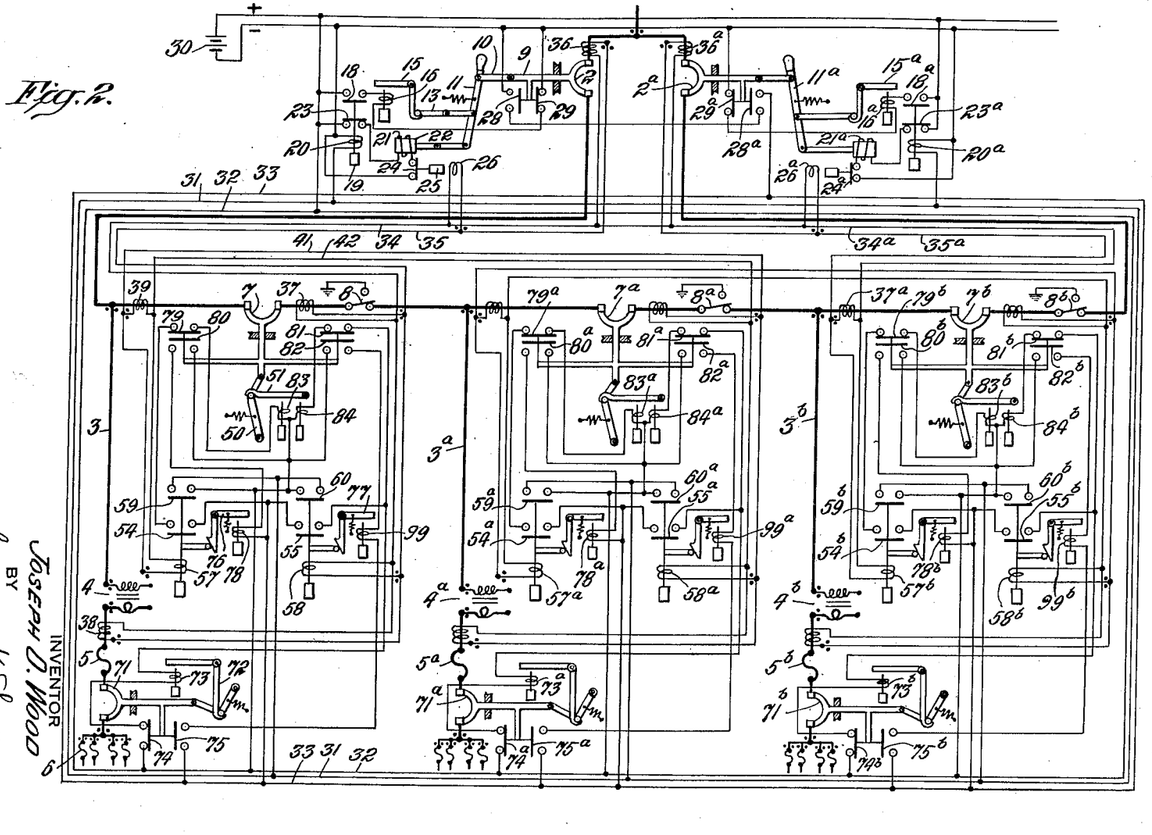
Figs. 2 and 3 are similar diagrams of modified forms of the system shown in Fig. 1.

Fig. 2 is similar to the disclosure of Fig. 1 except that instead of depending upon the feed back from the network system to blow the fuses 5 and 6 at the manholes, a circuit breaker is inserted in the manhole feeder which automatically opens when the manhole circuit breaker opens in order to insure the isolation of the manhole circuits from the network system. Also the disclosure of Fig. 2 differs from that of Fig. 1 in that an electric interlock, instead of a mechanical interlock, is introduced for insuring that the switches 54, 59 and 55, 60 of the affected manhole will not be opened until the manhole breaker of the loop circuit and the feeder breaker of the manhole have been opened. The parts in Fig. 2 corresponding to those of Fig. 1 are similarly numbered. Referring to the left-hand manhole of Fig. 2, a circuit breaker 71 is inserted in the feeder circuit between the fuses 5 and 6. This is diagrammatically shown retained in its closed position by a pivoted latch 72 controlled by a trip coil 73. The breaker is shown as controlling two switches 74 and 75 according to its position, the switch 74 being closed when the breaker 71 is closed while the switch 75 is then open. Upon the opening of the breaker the switch 75 is closed and the switch 74 is opened.

As to the switches 54, 59 and 55, 60, when they are moved from their normally open positions to their closed positions, they are restrained as indicated by latches 76, 77. These latches release their switches when their respective trip coils 78, 99 are energized. The opening and closing of the circuit breaker 7 controls the movement of two pairs of switches 79, 80 and 81, 82, the switches 79 and 81 being closed when this breaker is closed, while the switches 80 and 82 are then open; but upon the opening of the breaker 7, the switches 80 and 82 are closed and the switches 79 and 81 are opened. The retaining latch 51 of this breaker is adapted to be actuated by the energization of either of the tripping coils 83 or 84. The circuit connections of the parts just described will be understood from a description of their operation.

Let it first be assumed that a fault occurs in a portion of the main loop circuit between the substation breaker 2 and the manhole breaker 7, or in the circuit of feeder 3. This will so unbalance the potentials of the circuit 34, 35 as to cause the relay coil 58 to be energized and move switches 55, 60 to their closed positions and to be retained in their closed positions by the latch 77. This results in a circuit being closed from the positive line 32 through switch 69 to the pilot line 31 and then to the substation through relay coils 20, 20a to the negative line. This, as explained before, causes the trip coils 16, 16a to be energized and causes the opening of both substation breakers. The opening of the substation breakers causes the switches 28 and 28a to be closed which closes a circuit through the trip coils of the breakers 7 and 71 at the left-hand manhole by a circuit from positive line 32 through trip coil 84, switch 81 and switch 55 to the pilot line 33 and then through switches 28a and 28 to the negative line and also by a circuit from the positive line 32 through switch 74 and trip coil 73 of the breaker 71, through switch 55 to pilot line 33 and then through switches 28a, 28 to the negative line. This causes the opening of both breakers 7 and 71 at the left-hand manhole. The opening of both of these breakers is necessary in order to close the circuit of the coil 99 for releasing the latch 77 and permitting switches 55 and 60 to move to their open position, the circuit of releasing coil 99 being closed by a path from the positive wire 32 through switch 82 which is now closed, coil 99, switch 75 which is now closed, to pilot wire 33 and switches 28a and 28 at the substation to the negative line. The movement of the switches 55, 60 to their open position causes the deenergization of the relay coils 20 and 20a at the substation, permitting the closure of switches 23, 23a. This permits the breaker 2a to be closed automatically but does not permit the breaker 2 to be closed because the unbalancing of the circuit 34, 35 caused the coil 26 to open the switch 24 and thereby interrupt the closing circuit of the breaker 2 until this circuit is manually closed. Thus the portion of the loop circuit between the breakers 2 and 7 and the feeder 3 and transformer 4 will be isolated from the rest of the system, while power is supplied to the remaining portion of the loop circuit by the substation breaker 2a.

When a fault occurs in the section between manhole breakers 7 and 7a, or in feeder 3a, or transformer 4a, the action will result in first opening the breakers at the substation, then the opening of the manhole breakers 7, 7a and 71a and then the automatic reclosing of both substation breakers. This will be brought about by the unbalancing of the potentials applied by the current transformers to the circuit 41, 42 which causes the responsive coils 57 and 58a to become sufficiently energized to close their switches 54, 59 and 55a, 60a. This results in energizing the relay coils 20 and 20a at the substation by the closure of a circuit from positive line 32 through switch 60a to pilot wire 31 and coils 20, 20a to the negative line. The substation circuit breakers are then opened by their trip coils resulting in closure of the switches 28, 28a. This closes the trip coil circuits of the breakers 7, 7a and 71a, that of the breaker 7 being closed by a circuit from positive line 32 through trip coil 83, switch 79, switch 54 to pilot line 33 and then through switches 28a, 28 at the substation to the negative line, while the circuit of the trip coil of the breaker 7a will be closed from the positive line 32 through trip coil 84a, switch 81a, switch 55a to line 33 and then to the substation through switches 28a, 28 to the negative line; and the circuit of the trip coil 73a of breaker 71a will be closed by a circuit from positive line 32 through switch 74a, trip coil 73a, switch 55a to line 33 and then through the substation auxiliary switches 28a, 28 to the negative line. This results in the automatic opening of the manhole breakers 7, 7a and 71. The opening of these breakers will cause the deenergization of both relay coils 20, 20a at the substation and permit both closing coils of the substation breakers to be effective in actuating them to closed position. The release of the switches 54, 59 for this purpose is accomplished by the excitation of trip coil 78 by a circuit from positive line 32 through switch 80, coil 78 to line 33 and through switches 28a and 28 to the negative line, while the release of switches 55a, 60a is accomplished by the excitation of trip coil 99a by circuit from positive line 32 through switches 82a, coil 99a, switch 75a, pilot line 33 and then through substation switches 28a, 28 to the negative line. Thus the substation breakers 2, 2a can be reclosed only after the manhole breakers 7, 7a and 71 have been moved to their open positions. It is thus apparent that upon the occurrence of a fault in the region last indicated, the section between the manhole breakers 7 and 7a and the feeder 3a and transformer 4a will be isolated from the rest of the loop system and from the consumption network while the remaining portions of the system are continued in operation. Similarly any other faulty intermediate section of the loop will be disconnected from the remaining portion of the system automatically upon the occurrence of a fault therein while permitting the remaining portion of the system to remain in service.

Now assume that a fault occurs in the right-hand portion of the loop between the substation breaker 2a and the right-hand manhole. In that event, the potentials applied to the circuit 34a, 35a by the transformer windings 36a and 37a become sufficiently unbalanced to cause the responsive coil 57b to actuate its contacts 54b and 59b to their closed positions. This energizes the relays 20, 20a at the substation by closure of a circuit from positive line 32 through switch 59b to pilot wire 31 and then through the relay coils at the substation to the negative line. This causes the automatic opening of both substation breakers in the manner already described. This results in the opening of the manhole breaker 7b by closure of a circuit from positive line 32 through trip coil 83b, switch 79b, switch 54b to the pilot line 33 and to the substation and then through switches 28a, 28 to the negative line. The opening of the manhole breaker 7b then causes the trip coil 78b to automatically release the switches 54b, 59b and permits them to open by a circuit from positive wire 32 to switch 80b, trip coil 78b to pilot wire 33 and then to the substation through switches 28a, 28b to the negative line. This action then results in the deenergization of the relay coils 20, 20a at the substation, permitting the reclosing circuit of the breaker 2 to actuate it to the closed position while the breaker 2a is not permitted to close because the manual reset switch 24a has been opened by the unbalancing of the potentials applied to its relay coil 26a. The result is that the main breakers at the substation have first been opened, then the manhole breaker 7b has been opened and its opening has caused the automatic reclosure of the substation breaker 2 while not permitting the breaker 2a to close. Thus the defective section between the breaker 2a and manhole breaker 7b has been automatically isolated while the remaining portion of the power loop circuit remains in operation.

Figure 3:
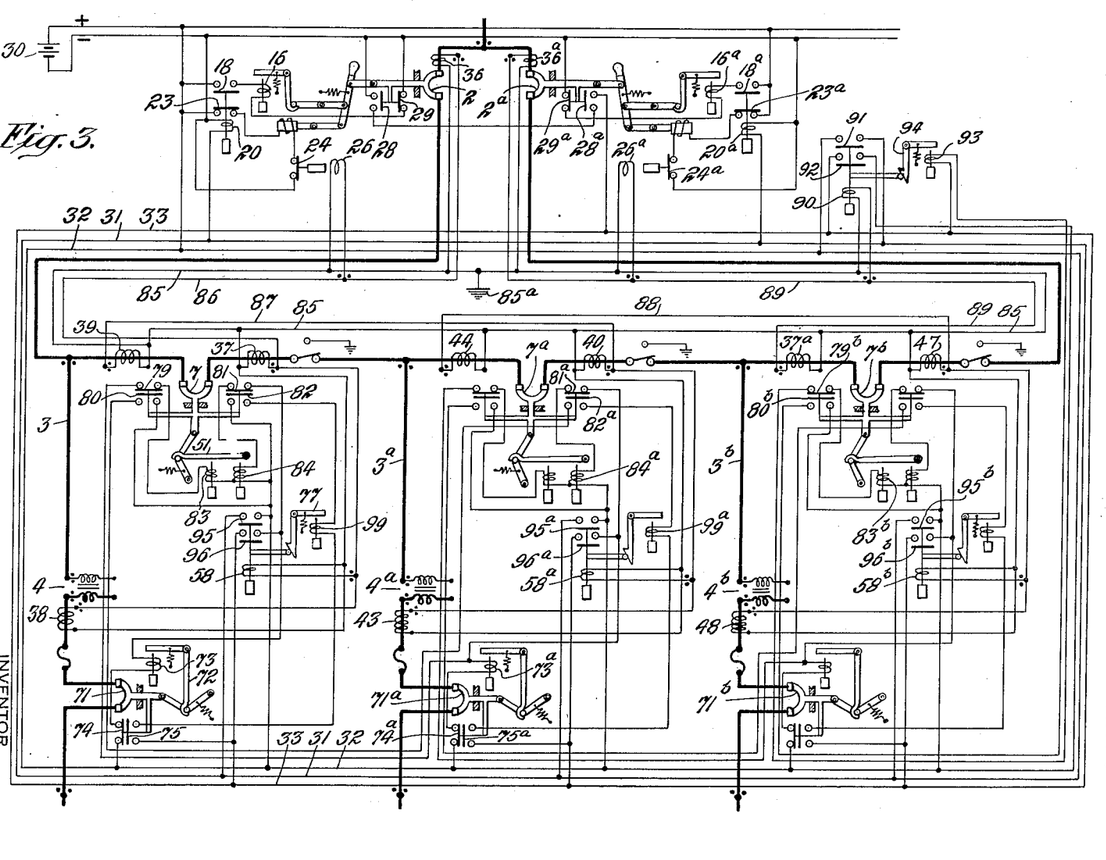

Fig. 3 is similar to Fig. 2 except that instead of using two relays responsive to abnormal fault conditions in each manhole and two electrically reset relays, only one is provided for each manhole. Also in Fig. 3 a common neutral control wire is grounded and extends from the substation in a loop to all of the manholes and the neutral of each of the controlling current transformer windings at the substation and at the manholes is connected thereto. This neutral wire 85 is shown grounded at 85a. Between this neutral wire and the three-phase line 86 is connected the current transformer windings 36 at the substation and the current transformer windings 37 and 38 at the left-hand manhole. Likewise the responsive relay coil 26 at the substation is connected between the neutral 85 and the three-phase line 86. The transformer windings 39 at the left-hand manhole and 40 and 43 at the next manhole are connected between the neutral line 85 and the three-phase line 87. Similarly the transformer windings 44 of the middle manhole and the transformer windings 47 and 48 at the right-hand manhole are connected between the neutral 85 and the three-phase line 88. The transformer windings 36a at the substation and the windings 37a at the right-hand manhole are connected between the neutral 85 and the three-phase line 89. At the substation, in addition to the responsive coil 26a being connected between the neutral 85 and the line 89, is connected another responsive relay coil 90 which when sufficiently energized will move the switches 91 and 92 to their closed positions. These switches after being closed can only be released by the trip coil 93 controlling the latch 94 which restrains the switches 91, 92 in closed position until released. The responsive coils 58, 58a and 58b at the manholes are connected to the current transformer lines as shown in Fig. 3 and when sufficiently energized, serve to move their switches 95, 96 and 95a, 96a and 95b and 96b to their closed positions when they are respectively energized. The connections of the various parts will be understood from the following description of operation.

If it be assumed that a fault occurs in the portion of the loop between the substation breaker 2 and the left-hand manhole breaker 7, or in the feeder 3 or transformer 4, the unbalancing of the current transformers 36, 37 and 38 in their relationship to the circuit 85, 86, will cause the coil 58 at the left-hand manhole to be sufficiently energized to move its contacts to the closed position. This closes a circuit from the positive line 32, through switch 95 to line 31 and through the relays 20, 20a at the substation to the negative line. This will cause the automatic opening of both substation breakers in the manner already described. The opening of these breakers causes the switches 28a, 28 to be closed which closes the circuit through the trip coil 84 of the left-hand circuit breaker by a circuit from positive line 32 through coil 84, switch 81, switch 96 to line 33 and then through the switches 28a, 28 to the negative line. Thus the circuit breaker 7 is automatically opened after the opening of the substation breakers. The manhole breaker 7I is also opened automatically by the closure of a circuit through its trip coil 73 from the positive line 32, through switch 74, coil 73, switch 96 to line 33 and then through switches 28a, 28 to the negative line. Upon the opening of these manhole breakers, the circuit is closed from positive wire 32 through switch 82, trip coil 99 and switch 85 to line 33 and then through switches 28a, 28 to the negative line. This causes the automatic release of the switches 95, 96 from their closed positions which action is dependent upon the substation breakers and the manhole breakers 7 and 7I first being moved to their open positions. The deenergization of relay 20a at the substation permits the breaker 2a to be closed in the manner already described while the breaker 2 is not automatically closed owing to the fact that the hand reset switch 24 has been moved to open position by the relay 26 being responsive to the unbalancing of the potentials applied to circuit 85, 86.

If it be assumed that the fault occurs in that portion of the loop between circuit breakers 7 and 7a or in the feeder 3a or transformer 4a, then the unbalancing of the potentials on the circuit 85, 87 as affected by the current transformers 39, 40 and 43, results in the relay coil 58a being sufficiently energized to close its contacts 95a, 96a. This closes a circuit from positive line 32 through switch 95a to line 31 and then through the relays 20, 20a at the substation to cause the opening of both substation breakers. This in turn causes the automatic opening of the circuit breakers 7, 7a and 7Ia by a circuit for tripping the breaker 7a from the positive line 32 through trip coil 84a, switch 81a, switch 96a to line 33 and then to the negative line through the switches 28a, 28, and for opening the circuit breaker 7 by a circuit from positive line 32 through trip coil 83 of the left-hand manhole, switch 79 and then to the right-hand manhole through switch 96a to line 33 and through switches 28a, 28 to the negative line, and for the circuit breaker 7Ia by a circuit from positive line 32 through switch 74a, trip coil 73a, switch 96a to line 33 and then through switches 28a, 28 to the negative line. In this way the section of the loop between circuit breakers 7 and 7a and the feeder to breaker 7Ia are cut out from the remaining portion of the system. The automatic reclosure of both substation breakers in the instance assumed, results from the deenergization of the relays 20, 20a at the substation by the automatic releasing of the switches 95a, 96a by a circuit through the trip coil 99a from positive line 32 at the left-hand manhole through switch 80 to switch 82a at the middle manhole, trip coil 99a, switch 75a to line 33 and then through switches 28a, 28 to the negative line. Thus the substation breakers cannot be reclosed until each of the breakers 7, 7a and 7Ia have moved to their opened positions because the closure of the releasing coil 99a is dependent upon the movement of auxiliary contacts to their closed positions by the opening of each of these breakers. In this way, the electrical interlocking of the circuits insures not only proper sequence of operation but also that the required breakers at the manholes for isolating the defective section have been opened before the substation breakers can be closed.

In the same way if a fault occurs in the section between the manhole breakers 7a, 7b, or feeder 3b, or transformer 4b, the sequence of operations just described will take place and result in isolating the defective section by the automatic opening of the breakers 7a, 7b and 7lb.

When a fault occurs in the section between the substation breaker 2a and the manhole breaker 7b, the action is quite different from that described in reference to Figs. 1 and 2. In Fig. 3, the unbalancing of the potentials applied to the circuit 89, 85 causes the relay 90 to move its contacts to their closed positions, which closes a circuit from positive line 32 through switch 91 to line 31 and then through the relays 20, 20a at the substation and thereby results in the opening of the substation breakers. Upon the opening thereof, a circuit is closed from the positive line 32 at the right-hand manhole through trip coil 83b, switch 79b, switch 92 to line 33 and then through switches 29a, 28 to the negative line. This results in opening the circuit breaker 7b at the right-hand manhole. The opening of this breaker results in the closing of auxiliary contacts which complete a circuit from positive line 32 through switch 80b and then through trip coil 93 to line 33 and through switches 28a, 28 to the negative line. This releases the contacts 91, 92 which results in opening the circuit of the relay coils 20, 20a at the substation and permitting the left-hand circuit breaker 2 to be automatically reclosed. However, the right-hand circuit breaker 2a is not reclosed because the responsive coil 26a has opened the hand reset switch 24a and thereby prevented the closing circuit of the breaker 2a from being completed. In this way the circuit breakers 2a and 7b have been opened and remain open to isolate the defective section while the remaining parts of the system are permitted to continue service to the distribution network.

Although I have described several embodiments of this invention and indicated various forms of apparatus for securing the desired results, it will be understood the invention may be practiced in various other ways and that the form of apparatus and types of devices may be such as to suit the particular choice of the designer and apply to the individual requirements in various cases without departing from the scope of the invention.

I claim:

1. An electric distribution system comprising a main source of energy, a loop circuit extending therefrom subdivided in successive portions in series with each other and comprising supply and return lines, sub-feeders extending from said loop circuit portions, circuit interrupting means for opening the connection between the loop circuit and the source, circuit breakers in the loop circuit at distribution sections for isolating said portions of the loop circuit to which the sub-feeders are connected respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of said circuit interrupting means, and means controlled by the opening of said circuit interrupting means for opening at least two of said circuit breakers in the loop circuit for isolating the portion of the loop circuit affected by the abnormal condition.

2. An electric distribution system comprising a main source of energy, a loop circuit extending therefrom subdivided in successive portions in series with each other and comprising supply and return lines, sub-feeders extending from said loop circuit portions, circuit interrupting means for opening the connection between the loop circuit and the source, circuit breakers in the loop circuit at distribution sections for isolating said portions of the loop circuit to which the sub-feeders are connected respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of said circuit interrupting means, means controlled by the opening of said circuit interrupting means for opening at least two of said circuit breakers in the loop circuit for isolating the portion of the loop circuit affected by the abnormal condition, and means dependent upon the opening of both of said two circuit breakers for effecting the reclosure of said circuit interrupting means.

3. An electric distribution system comprising a main source of energy, a loop circuit extending therefrom, sub-feeders extending from said loop circuit, circuit interrupting means for opening the connection between the loop circuit and the source, circuit breakers in the loop circuit at distribution sections for isolating portions of the loop circuit to which the sub-feeders are connected respectively, circuit breakers in the sub-feeders respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of said circuit interrupting means, and means controlled by the opening of said circuit interrupting means for opening at least two of said circuit breakers in the loop circuit for isolating the portion of the loop circuit affected by the abnormal condition and for also opening the circuit breaker in the sub-feeder connected to the portion of the loop circuit affected by the abnormal condition.

4. An electric distribution system comprising a main source of energy, a loop circuit extending therefrom, sub-feeders extending from said loop circuit, circuit interrupting means for opening the connections between the loop circuit and the source, circuit breakers in the loop circuit at distribution sections for isolating portions of the loop circuit to which the sub-feeders are connected respectively, circuit breakers in the sub-feeders respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of said circuit interrupting means, means controlled by the opening of said circuit interrupting means for opening at least two of said circuit breakers in the loop circuit for isolating the portion of the loop circuit affected by the abnormal condition and for also opening the circuit breaker in the sub-feeder connected to the portion of the loop circuit affected by the abnormal condition, and means dependent upon the opening of both of said two circuit breakers and the circuit breaker in said last named sub-feeder for effecting the reclosure of said circuit interrupting means.

5. An electric distribution system comprising a main source of energy, a loop circuit extending therefrom, sub-feeders extending from said loop circuit, circuit interrupting means for opening the connection between the loop circuit and the source, circuit breakers in the loop circuit at distribution sections for isolating portions of the loop circuit to which the sub-feeders are connected respectively, circuit breakers in the sub-feeders respectively, responsive devices located at each end of said loop portions and at the sub-feeders at the distribution sections and respectively responsive to abnormal conditions in the different portions of the loop circuit and in the sub-feeders, relay devices located at the distribution sections responsive respectively to abnormal conditions of said responsive devices, means controlled by said relay devices for effecting the opening of said circuit interrupting means, and means controlled by the opening of said circuit interrupting means for opening at least two of said circuit breakers in the loop circuit for isolating the portion of the loop circuit affected by the abnormal condition and for also opening the circuit breaker in the sub-feeder connected to the portion of the loop circuit affected by the abnormal condition.

6. An electric distribution system comprising a main source of energy, a loop circuit extending therefrom, sub-feeders extending from said loop circuit, circuit interrupting means for opening the connection between the loop circuit and the source, circuit breakers in the loop circuit at distribution sections for isolating portions of the loop circuit to which the sub-feeders are connected respectively, circuit breakers in the sub-feeders respectively, responsive devices located at each end of said loop portions and at the sub-feeders at the distribution sections and respectively responsive to abnormal conditions in the different portions of the loop circuit and in the sub-feeders, relay devices located at the distribution sections responsive respectively to abnormal conditions of said responsive devices, means controlled by said relay devices for effecting the opening of said circuit interrupting means, means controlled by the opening of said circuit interrupting means for opening at least two of said circuit breakers in the loop circuit for isolating the portion of the loop circuit affected by the abnormal condition and for also opening the circuit breaker in the sub-feeder connected to the portion of the loop circuit affected by the abnormal condition, and means dependent upon the opening of both of said two circuit breakers and the circuit breaker in said last named sub-feeder for effecting the reclosure of said circuit interrupting means.

7. An electric distribution system comprising a main source of energy, a loop circuit extending therefrom, sub-feeders extending from said loop circuit, circuit interrupting means for opening the connection between the loop circuit and the source, circuit breakers in the loop circuit at distribution sections for isolating portions of the loop circuit to which the sub-feeders are connected respectively, responsive devices located at each end of said loop portions at the distribution sections and respectively responsive to abnormal conditions in the different portions of the loop circuit, relay devices located at the distribution sections and movable to their closed positions in response respectively to abnormal conditions of said responsive devices, means for restraining said relay devices in their closed positions when so moved, means controlled by said relay devices for effecting the opening of said circuit interrupting means, means controlled by the opening of said circuit interrupting means for opening at least two of said circuit breakers in the loop circuit for isolating the portion of the loop circuit affected by the abnormal condition, mechanical means operated by the opening of said two circuit breakers for releasing said restraining means for allowing said relay devices to assume their normal open positions, and means dependent upon said relay devices assuming their normal positions for effecting the reclosure of said circuit interrupting means.

8. An electric distribution system comprising a main source of energy, a loop circuit extending therefrom, sub-feeders extending from said loop circuit, circuit interrupting means for opening the connection between the loop circuit and the source, circuit breakers in the loop circuit at distribution sections for isolating portions of the loop circuit to which the sub-feeders are connected respectively, responsive devices located at each end of said loop portions at the distribution sections and respectively responsive to abnormal conditions in the different portions of the loop circuit, relay devices located at the distribution sections and movable to their closed positions in response respectively to abnormal conditions of said responsive devices, means for restraining said relay devices in their closed positions when so moved, means controlled by said relay devices for effecting the opening of said circuit interrupting means, means controlled by the opening of said circuit interrupting means for opening at least two of said circuit breakers in the loop circiut for isolating the portion of the loop circuit affected by the abnormal condition, electrical means operated by the opening of said two circuit breakers for releasing said restraining means for allowing said relay devices to assume their normal open positions, and means dependent upon said relay devices assuming their normal positions for effecting the reclosure of said circuit interrupting means.

9. An electric distribution system comprising a main source of energy, a loop circuit extending therefrom, sub-feeders extending from said loop circuit, circuit interrupting means for opening the connection between the loop circuit and the source, circuit breakers in the loop circuit at distribution sections for isolating portions of the loop circuit to which the sub-feeders are connected respectively, circuit breakers in the sub-feeders respectively, responsive devices located at each end of said loop portions and at the sub-feeders in the distribution sections and respectively responsive to abnormal conditions in the different portions of the loop circuit and in the sub-feeders, relay devices located at the distribution sections and movable to their closed positions in response respectively to abnormal conditions of said responsive devices, means controlled by said relay devices for effecting the opening of said circuit interrupting means, means controlled by the opening of said circuit interrupting means for opening at least two of said circuit breakers in the loop circuit for isolating the portion of the loop circuit affected by the abnormal condition and for also opening the circuit breaker in the sub-feeder connected to the portion of the loop circuit affected by the abnormal condition, means operated by the opening of said two circuit breakers and the circuit breaker in the sub-feeder for releasing said restraining means for allowing said relay devices to assume their normal open positions, and means dependent upon said relay devices assuming their normal positions for effecting the reclosure of said circuit interrupting means.

10. An electric distribution system comprising a main source of energy, a loop circuit extending therefrom subdivided in successive portions in series with each other and comprising supply and return lines, two circuit interrupting devices connecting respectively the main ends of the loop to the source, sub-feeders extending from said loop circuit portions, circuit breakers in the loop circuit at distribution sections for isolating said portions of the loop circuit to which the sub-feeders are connected respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of both of said circuit interrupting devices, and means controlled by the opening of both of said circuit interrupting devices for opening at least two of said circuit breakers in the loop circuit for isolating the portion of the loop circuit affected by the abnormal condition.

11. An electric distribution system comprising a main source of energy, a loop circuit extending therefrom subdivided in successive portions in series with each other and comprising supply and return lines, two circuit interrupting devices connecting respectively the main ends of the loop to the source, sub-feeders extending from said loop circuit portions, circuit breakers in the loop circuit at distribution sections for isolating said portions of the loop circuit to which the sub-feeders are connected respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of both of said circuit interrupting devices, means controlled by the opening of both of said circuit interrupting devices for opening at least two of said circuit breakers in the loop circuit for isolating the portion of the loop circuit affected by the abnormal condition, and means dependent upon the opening of both of said two circuit breakers for effecting the reclosure of both of said circuit interrupting devices.

12. An electric distribution system comprising a main source of energy, a loop circuit extending therefrom, two circuit interrupting devices connecting respectively the main ends of the loop to the source, sub-feeders extending from said loop circuit, circuit breakers in the loop circuit at distribution sections for isolating portions of the loop circuit to which the sub-feeders are connected respectively, circuit breakers in the sub-feeders respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of both of said circuit interrupting devices, and means controlled by the opening of both of said circuit interrupting devices for opening at least two of said circuit breakers in the loop circuit for isolating the portion of the loop circuit affected by the abnormal condition and also for opening the circuit breaker in the sub-feeder connected to the portion of the loop circuit affected by the abnormal condition.

13. An electric distribution system comprising a main source of energy, a loop circuit extending therefrom, two circuit interrupting devices connecting respectively the main ends of the loop to the source, sub-feeders extending from said loop circuit, circuit breakers in the loop circuit at distribution sections for isolating portions of the loop circuit to which the sub-feeders are connected respectively, circuit breakers in the sub-feeders respectively, responsive devices located at each end of said loop portions at the distribution sections and respectively responsive to abnormal conditions in the different portions of the loop circuit, relay devices located at the distribution sections responsive respectively to abnormal conditions of said responsive devices, means controlled by said relay devices for effecting the opening of both of said circuit interrupting devices, means controlled by the opening of both of said circuit interrupting devices for opening at least two of said circuit breakers in the loop circuit for isolating the portion of the loop circuit affected by the abnormal condition and also for opening the circuit breaker in the sub-feeder connected to the portion of the loop circuit affected by the abnormal condition, and means dependent upon the opening of both of said two circuit breakers and the circuit breaker in said last named sub-feeder for effecting the reclosure of both of said circuit interrupting devices.

14. An electric distribution system comprising a main source of energy, a loop circuit extending therefrom subdivided in successive portions in series with each other and comprising supply and return lines, two circuit interrupting devices connecting respectively the main ends of the loop to the source, sub-feeders extending from said loop circuit portions, circuit breakers in the loop circuit at distribution sections for isolating said portions of the loop circuit to which the sub-feeders are connected respectively, responsive devices responsive respectively to abnormal conditions in the different portions of the loop circuit, relay devices located at the distribution sections responsive respectively to abnormal conditions of said responsive devices, means controlled by said relay devices for effecting the opening of both of said circuit interrupting devices, means controlled by the opening of both of said circuit interrupting devices for opening at least one of said circuit breakers in the loop circuit for isolating the portion of the loop circuit between the distribution section and one of said circuit interrupting devices, and means controlled by the opening of said last named circuit breaker for effecting the reclosure of the circuit interrupting device connected to the unaffected portion of the loop circuit.

15. An electric distribution system comprising a main source of energy, a loop circuit extending therefrom, two circuit interrupting devices connecting respectively the main ends of the loop to the source, sub-feeders extending from said loop circuit, circuit breakers in the loop circuit at distribution sections for isolating portions of the loop circuit to which the sub-feeders are connected respectively, responsive devices responsive respectively to abnormal conditions in the different portions of the loop circuit, relay devices located at the distribution sections responsive respectively to abnormal conditions of said responsive devices, means controlled by said relay devices for effecting the opening of both of said circuit interrupting devices, means controlled by the opening of said circuit interrupting devices for opening at least two of said circuit breakers in the loop circuit for isolating intermediate portions of the loop circuit when affected by the abnormal condition and for opening at least one of said circuit breakers in the loop circuit connected to an end portion of the loop circuit when the abnormal condition occurs between said last named circuit breaker and one of said circuit interrupting devices, and means dependent upon the opening of both of said two circuit breakers for effecting the reclosure of both of said circuit interrupting devices and dependent upon the opening of said one circuit breaker for effecting the reclosure of the circuit interrupting device connected to the unaffected end portion of the loop circuit.

16. An electric distribution system comprising a main source of energy, a loop circuit extending therefrom, two circuit interrupting devices connecting respectively the main ends of the loop to the source, sub-feeders extending from said loop circuit, circuit breakers in the loop circuit at distribution sections for isolating portions of the loop circuit to which the sub-feeders are connected respectively, responsive devices responsive respectively to abnormal conditions in the different portions of the loop circuit, relay devices located at the distribution sections responsive respectively to abnormal conditions of said responsive devices, means controlled by said relay devices for effecting the opening of both of said circuit interrupting devices, means controlled by the opening of said circuit interrupting devices for opening at least two of said circuit breakers in the loop circuit for isolating intermediate portions of the loop circuit when affected by the abnormal condition and for opening at least one of said circuit breakers in the loop circuit connected to an end portion of the loop circuit when the abnormal condition occurs between said last named circuit breaker and one of said circuit interrupting devices, means dependent upon the opening of both of said two circuit breakers for effecting the reclosure of both of said circuit interrupting devices and dependent upon the opening of said one circuit breaker for effecting the reclosure of the circuit interrupting device connected to the unaffected end portion of the loop circuit, and means for affecting the circuit interrupting device which is connected to the affected end portion of the loop circuit for preventing its automatic reclosure upon the opening of said last named circuit breaker.

JOSEPH D. WOOD.